United States Patent [19]

Horberg, Jr. et al.

[11] 3,807,928

[45] Apr. 30, 1974

[54] BLOW MOLD IMPROVEMENTS

[75] Inventors: Charles Horberg, Jr., Northbrook; Richard K. Shelby, Hinsdale, both of Ill.

[73] Assignee: Monsanto Company, St. Louis, Mo.

[22] Filed: Mar. 24, 1972

[21] Appl. No.: 237,857

[52] U.S. Cl. ............ 425/387 B, 249/156, 249/160, 425/DIG. 203, 425/DIG. 204, 425/DIG. 232, 425/DIG. 233, 425/450
[51] Int. Cl. .......................................... B29d 23/03
[58] Field of Search ....... 425/DIG. 211, 387, 387 B, 425/DIG. 214, DIG. 203, DIG. 204, DIG. 232, DIG. 233; 249/156, 160, 161, 162

[56] References Cited
UNITED STATES PATENTS

| | | | |
|---|---|---|---|
| 2,784,452 | 3/1957 | Ruekberg et al. | 425/DIG. 211 |
| 3,032,810 | 5/1962 | Soubier | 425/387 B |
| 3,398,427 | 8/1968 | John | 425/DIG. 214 |
| 3,399,424 | 9/1968 | Sheptak | 425/DIG. 214 |
| 3,538,211 | 11/1970 | Adomaitis | 425/387 X |
| 3,550,197 | 12/1970 | Szajna et al. | 425/DIG. 214 |
| 3,596,870 | 8/1971 | Walker et al. | 249/156 |
| 3,597,793 | 8/1971 | Weeler et al. | 425/387 B |

Primary Examiner—Richard B. Lazarus
Attorney, Agent, or Firm—Michael J. Murphy

[57] ABSTRACT

Improvements in blow molding apparatus of the type which includes separable mold sections individually mounted on carrier blocks, the sections, when in closed position, having cavities which define the shape of an elongated article having a finished end portion. Each section comprises at least two aligned, abutting parts which together form one half of the cavity defining the shape of the molded article. Individual parts of a two part mold section may be replaced with other parts having different cavity configurations to facilitate building up different molds from a minimum stock of parts. Means are provided for longitudinally and laterally locating the parts in proper position on the carrier block to which they are attached.

8 Claims, 4 Drawing Figures

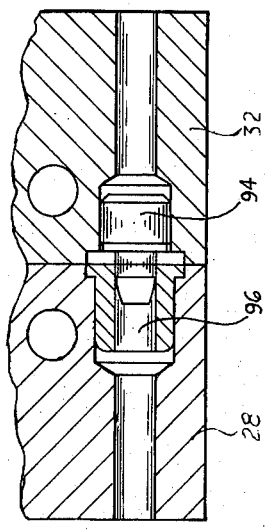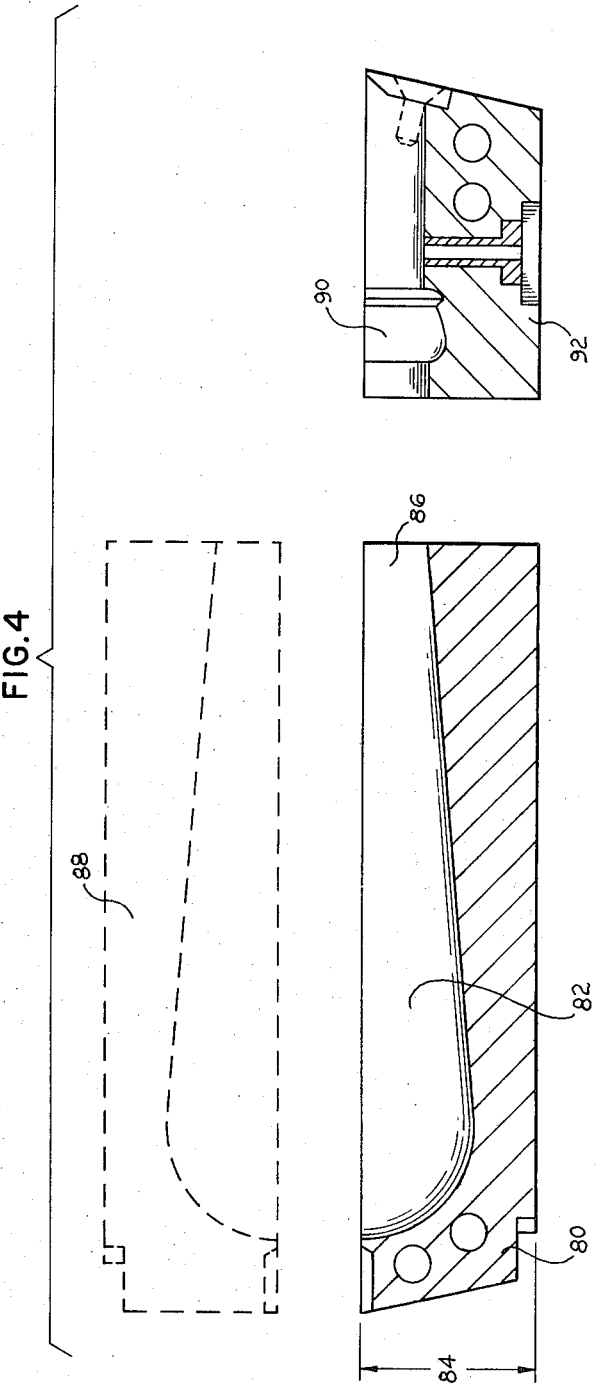
FIG. 3
FIG. 4

BLOW MOLD IMPROVEMENTS

BACKGROUND OF THE INVENTION

This invention relates to blow molding and more particularly to improved blow mold structure.

Blow molding machines of the type consisting of a wheel mounted for rotation in a vertical plane having a plurality of radially attached mold sections coupled to the wheel adjacent its periphery are known in the prior art, e.g., U.S. Pat. No. 2,784,452. With this type of system, each station includes a mold cavity defined by inner and outer mold sections, with cam followers being provided which cooperate with a fixed mold cam to move the outer mold half between open and closed position. A hollow needle is actuated after the mold sections close to puncture the wall of an enclosed parison portion and expand it outwardly against the cavity walls to form the article. At a preselected point in the circular path of travel, each mold is opened with provisions usually made for the article to stay with the outer mold section, whereupon a knockout pin is actuated at the appropriate time to kick the molded article out of the outer mold section.

In this type of blow molding machine as well as in others, it is conventional to support each mold section on a carrier block, and when it is desired to change the output of a machine from one molded configuration to another, the mold sections at each station are removed from their carrier blocks and replaced with other different mold sections. This usually means that a relatively large number of rather expensive mold halves must be kept in stock in a blow molding plant if it is desired to have the capability of supplying a wide variety of finished article configurations. However, in changing from one molded shape to another, it may be that certain portions of the second shape are the same as the first, as where a particular line of blow molded products belong to a family having common features, yet in such instances it has been customary in the past to have on hand mold sections having cavity portions for molding the common as well as the differing portions of the articles. In other words, though different articles had certain common features, a single mold section part for molding the common features has not been used.

Also, in the past, it has been necessary to remove the blow needle and knockout pin from their positions in the mold means of each mold station in order to allow removal of the mold sections, and to replace these parts again after the next sections were installed. Needless to say, this undesirably adds to the machine downtime for mold changeover. Also, in installing each section, it must be positioned on its carrier block so that the sockets for the hold down bolts are aligned. Dowel pins on either the block or mold section have been used, but these can cause problems when the blocks and mold sections are formed of different materials having different coefficients of expansion and which are at different temperatures, e.g., having not yet reached equilibrium from a just completed blow molding run.

SUMMARY OF THE INVENTION

Now, however, there has been developed improved blow mold structure which overcomes these prior art difficulties.

Accordingly, a principal object of this invention is to provide improved blow mold means useful in any type of blow molding environment, but especially so in a wheel type blow mold machine using a hollow needle to introduce blow air into a tubular parison within the blow mold to expand it outwardly into the shape of an article.

Another object of this invention is to provide such improved blow mold structure which facilitates rapid changeover from one mold configuration to another to minimize blow molding machine down time in a high volume output system.

A further object of this invention is to provide such improved blow mold structure which does not require removal of the blow needle or knockout pin in changing from one mold configuration to another.

A further object of this invention is to provide improved means for longitudinally and laterally aligning a multi-piece blow mold section on an associated carrier block.

Another object of this invention is to reduce the number of blow molds necessary to produce a series of different molded shapes.

An additional object of this invention is to provide a plurality of different but structurally related blow mold components from which a number of different blow molds may be assembled depending on the selection of the individual components.

Another object of this invention is to provide a blow mold section constructed of one type of material and a carrier block formed of a different material which can differentially expand and contract with respect to each other.

Other objects of this invention will in part be obvious and will in part appear hereinafter.

These and other objects are accomplished in a blow molding apparatus which includes separable mold sections having cavity portions which define the shape of an elongated article having a finished end portion and a carrier block for supporting each section by providing the improvement wherein each mold section comprises two abutting parts, each part being separately releasably attached to a common carrier block, one of said parts being shorter than the other and having a cavity section which at least in part defines the finish portion of the article, the other of said parts being formed with a cavity defining the body portion of the article in alignment with the cavity section of said one part and means on said blocks and parts for longitudinally and laterally locating said parts in preselected position on the carrier block to which they are attached.

A second mold section part is provided which has a different body defining cavity from the part which it is desired to change, this second mold section part being adapted to be aligned exactly with the finish defining cavity of the short mold section part when the first mentioned mold section part is replaced on the carrier block with the second mold section part.

The shorter mold section part of each mold section preferably has a bore formed therein perpendicular to the parting line of the blow mold and which extends into the carrier block to which it is attached. A bushing is provided in the bore extension into the carrier block which has projecting means thereon for cooperating with an opposite surface portion of the shorter mold part to locate the latter longitudinally on the carrier block.

Means are preferably provided for locating each mold section in the opposite, lateral direction and include a matching key preferably integrally formed with the carrier block and a slot or keyway formed in the abutting surface of the mold section part containing the cavity defining the body portion of the molded article. Such lateral aligning means are preferably formed at one end of the blow mold, and the keyway is preferably greater in length than the key to permit the body defining parts of the mold section to expand or float longitudinally as required depending on the temperature thereof.

BRIEF DESCRIPTION OF THE DRAWINGS

In describing the overall invention, reference will be made to the accompanying drawings wherein:

FIG. 3 is a sectional view taken along 3—3 of FIG. 2; and

FIG. 4 is a sectional, schematic view of alternative mold components useable in the apparatus of FIG. 1.

DETAILED DESCRIPTION OF THE ILLUSTRATED EMBODIMENTS

Figure 1:
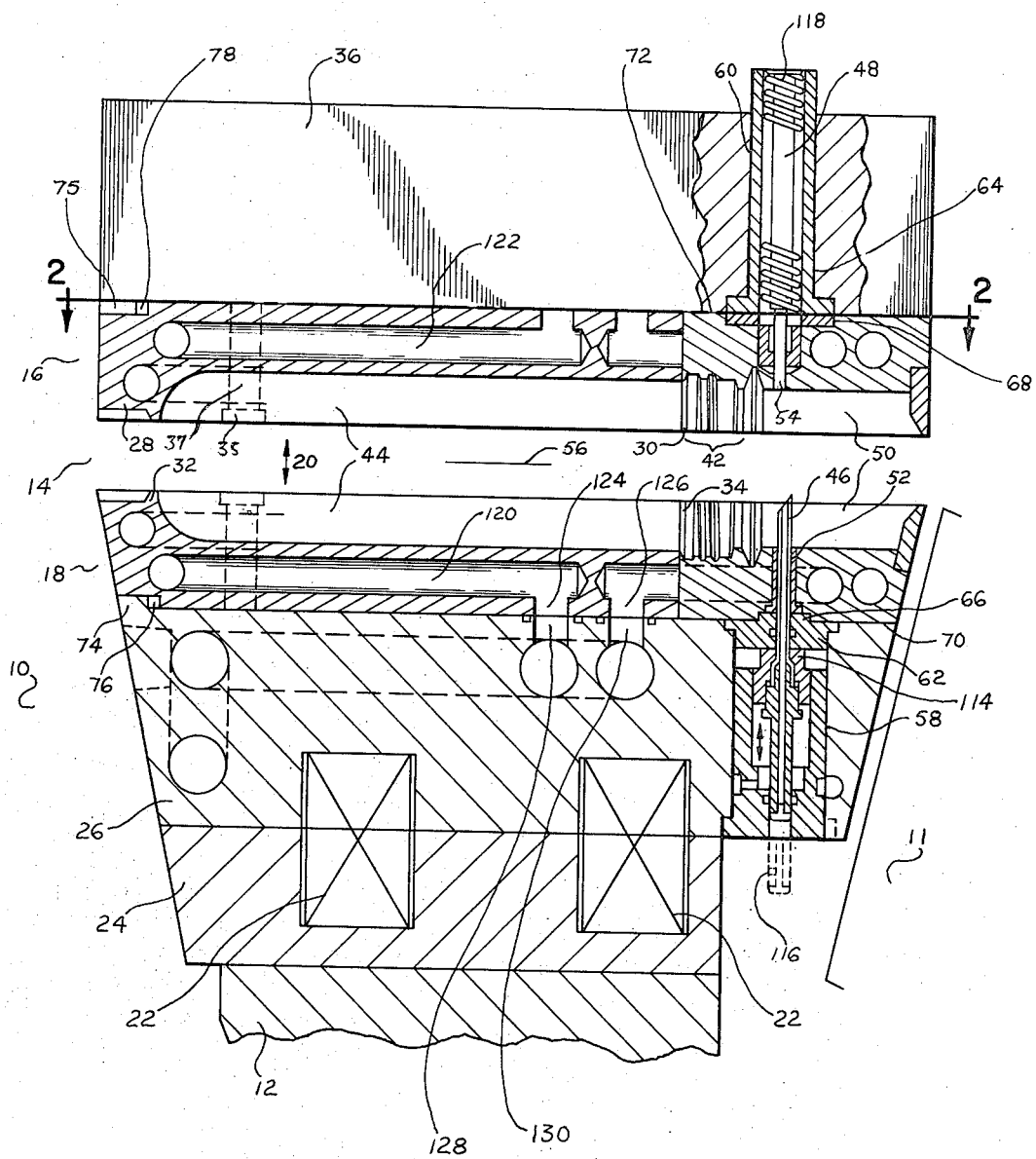
FIG. 1 is a vertical, sectional view of apparatus embodying the present invention.

Referring now to the drawings, there is shown in FIG. 1, one station 10 of a multi-station rotary blow molding machine for forming hollow articles from portions of a continuously extruding thermoplastic parison. Since such extrusion means and thermoplastic parison are conventional to those skilled in the art as shown in U.S. Pat. No. 2,784,452, they are not shown herein. An immediately adjacent identical station 11 is depicted in FIG. 1 in outline form.

In brief, the blow molding machine of which station 10 forms a part comprises a driven, horizontal central shaft carrying a hub to which a large diameter circular support plant is secured. A series of elongated arms extending radially of the wheel axis are in turn fastened to the support plate, one arm per mold station. Such structure is shown in U.S. Pat. No. 2,784,452 and does not appear in the present drawings. A mold spacer casting 12 (FIG. 1) is provided as a part of each mold station 10 and is secured to its respective radially extending arm, not shown.

Means may be provided at each station 10 to resiliently support the mold means on the machine to compensate for machining inaccuracies in the cam arrangement (not shown) for opening and closing the mold. Such means may comprise a series of coil springs schematically illustrated as 22 in FIG. 1 situated in opposing cavities formed in the rear of carrier block 26 and in backup plate 24, the latter being rigidly mounted on spacer casting 12.

Split mold means 14 are provided at each molding station 10 and include outer mold section 16 and inner mold section 18, each of which has an internal cavity portion which together define the shape of an elongated article when outer section 16 is closed on inner section 18. Such movement in the direction of arrow 20 is accomplished by means of the previously mentioned cooperation between cam followers and a fixed mold opening and closing cam (not shown).

According to the present invention, each inner and outer mold section 18 and 16 comprises two abutting parts 32, 34 and 28, 30 respectively, although more than such two parts per section may alternatively be provided. Each such part is separately releasably attached to a common carrier block, parts 32 and 34 being mounted on inner mold section carrier block 26 and parts 28 and 30 being attached to outer mold section carrier block 36, by means of suitable conventional threaded bolts, e.g., as depicted in outline form at 37 in FIG. 1, extending into sockets in the section parts and in the carrier blocks, e.g., as shown at 38 and 40 in outer mold section carrier block 36 in FIG. 2. Such sockets should be countersunk to allow the bolt heads to fit therein as at 35 in FIG. 1, and permit flush closing of the sections on each other about parting line 56. One of the parts 30, 34 of each mold section is shorter than the other part 28, 32 in the illustrated embodiment, and has a cavity section which, e.g., at 42, defines the finish portion of the article to be formed in the mold. Such finish in the illustrated embodiment of FIG. 1 comprises a series of circular threads, though obviously alternative finish configurations could be used. Parts 28 and 30 are formed with opposing identical cavity portions 44 which define the body portion of the molded article. Each part 32, 28 is perfectly longitudinally aligned with its associated part 30, 34 such that cavity sections of the shorter finish defining parts are extended in an uninterrupted manner by cavity section 44 of the longer parts, as illustrated in FIG. 1.

Means are provided on carrier blocks 26 and 36 and on inner and outer mold sections 18 and 16 for longitudinally and laterally locating sections 18 and 16 such that the sockets for the hold down bolts in the mold sections are aligned with those in the carrier blocks. Longitudinal herein means the direction along the plane of rotation of the wheel or in the direction of elongated cavity 44, whereas lateral means the direction transverse to such plane or perpendicular to the axis of cavity 44. The means for longitudinal alignment are associated with a blow needle assembly which includes hollow blow needle 46 and a knockout assembly which includes knockout pin 48 which needle and pin enter flash defining cavity 50 of mold section parts 30 and 34 through bores 52 and 54 formed in parts 30 and 34 respectively and extending perpendicular to mold parting line 56 in FIG. 1, such bores extending as at 58 and 60 into carrier blocks 26 and 36. Bushings 62 and 64 are provided in extensions 58 and 60 respectively and have projecting means thereon for cooperating with an opposite surface portion of mold parts 34 and 30 to provide the central mold part locating point with respect to a carrier block. In the embodiment of FIG. 1, such projecting means comprise nose portions 66 and 68 on each of bushings 62 and 64, which portions are adapted to seat in an opposite depression in each of surfaces 70 and 72 of mold section parts 34 and 30. The means for laterally locating an inner and outer mold section on its carrier block 26 and 36 comprises a key 74, 75 which is preferably formed as an integral part of and at the extremity of each carrier block 26, 36, and a matching keyway 76, 78 formed in the abutting surfaces 70, 72 of mold section parts 32 and 28. Though it is possible to reverse the position of a matching key and keyway combination, it is preferable that the key be formed in a carrier block to avoid machining individual keys on every mold section part which is to be mounted on a carrier block. The matching key and slot combinations are preferably formed on the longitudinal centerline of the carrier block and body defining mold section parts as illustrated in FIG. 2.

As part of the present invention, additional mold parts such as illustrated at 80 in FIG. 4 may be provided having a different body defining cavity portion 82 from that in mold section part 32. As is obvious, the overall length of part 80 and depth in the direction of 84 in FIG. 4 should be equivalent to the corresponding dimensions of part 32 in FIG. 1, and the position and dimensions of end portion 86 of cavity 82 should be such that it forms a surface extension of finish defining cavity 42 of short mold section 34 on replacing mold section part 32 on carrier block 26 with mold section part 80. Similar considerations apply with respect to the outer mold section part 88 in FIG. 4 and 28 in FIG. 1 on carrier block 36.

Also, alternatively, if it is desired to maintain the molded shape provided by cavity 44 in FIG. 1, and to change the type of finish, e.g., from the threads at 42 in FIG. 1 to a crown type finish 90 in FIG. 4, the respective cavities 44 and 90 of parts 32 and 92 respectively are adapted to line up with each other such that on replacing short mold section parts 30 and 34 with parts such as that illustrated at 92, a molded article configuration will be obtained which differs from what would be obtained with the mold of FIG. 1 to the extent of having a crown type rather than a threaded finish. Obviously alternative types of body and finish configurations to those illustrated may be provided, the only necessity being that the overall outer dimensions in terms of length, breadth and width of each of the mold section parts should be the same.

Figure 2:
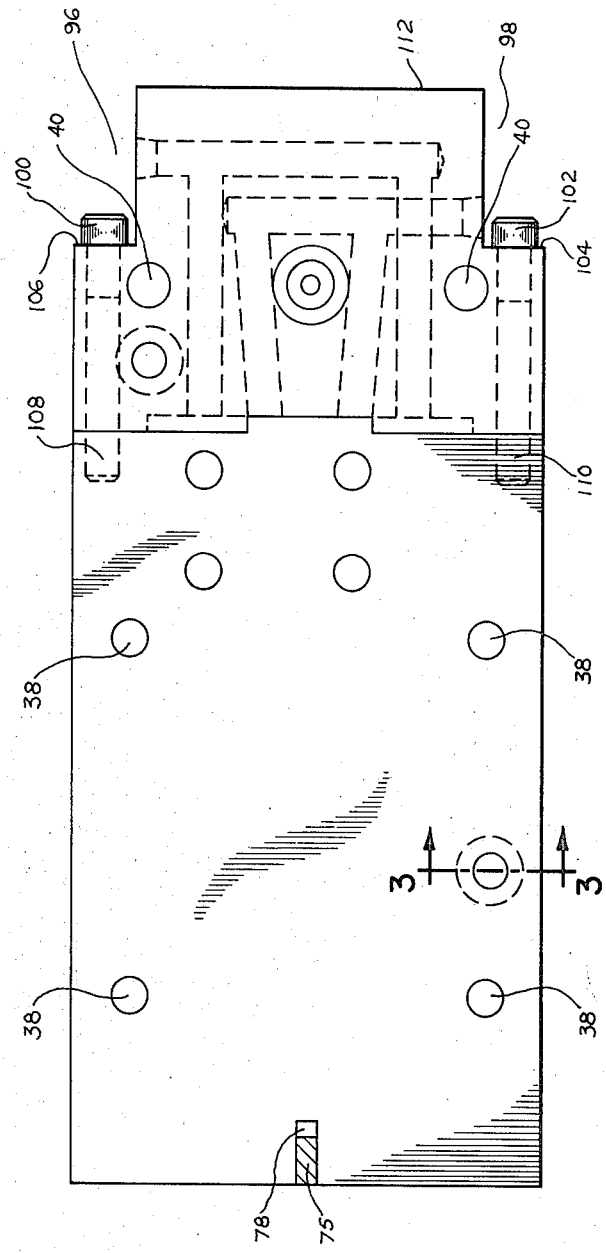
FIG. 2 is a sectional view taken along 2—2 of FIG. 1.

In mounting an inner mold section on a carrier block 26, short mold section part 34 is initially moved around on the face of block 26 until cylindrical nose portion 66 enters the depression in surface 70 whereupon the sockets in the carrier block will be aligned with those in part 34, e.g., 40 in FIG. 2. Part 32 is then positioned such that key 74 enters keyway 76 which means that the article forming cavities of the two parts are then in perfect alignment in the crosswise or lateral direction, and on forcing part 32 against longitudinally anchored part 34, hold down bolts, e.g., 37, may be inserted in the sockets 38 and 40 to securely fasten such parts to carrier block 26. A suitable dowel pin 94 (FIG. 3) may be provided in one mold section part for insertion into a cavity 96 in a bushing in its opposite mold section part to provide for fine alignment of the opposing parts as they close on each other. Though it may not be essential, in order to ensure that each pair of abutting mold section parts, e.g., 32 and 34, are in tight abutting relationship in order to avoid generating lines in the molded article, such abutting parts of each mold section may be releasably secured to each other, e.g., as illustrated in FIG. 2, by means such as bolts 100 and 102 extending through vertical surfaces 104, 106 of each of a pair of steps 96 and 98 formed in the end face 112 of one of the abutting parts, e.g., short mold part 30, and into mold section part 28 as at 108 and 110. By securing abutting parts together in this manner, projecting ends of the securing members beyond face 112 of the short mold section part are avoided, and thus the adjacent part of the next mold station 11 can be placed as close as possible to that of mold station 10 as illustrated in FIG. 1, such close relationship serving to minimize the amount of waste material formed between adjacent mold stations during operation of the machine. Also, as can be recognized in FIG. 1, by merely retracting hollow needle 46 such that the piston 114 on which it is mounted assumes its rearwardmost position in bore 58 as illustrated at 116 in FIG. 1, mold section part 34 may be removed and another one, e.g., 92 (FIG. 4), positioned on block 26 without having to completely remove needle 46 and the associated parts of the needle mechanism from their operating positions in blow mold station 10. Similar considerations apply with respect to knockout pin 48 which is biased to the rear away from cavity portion 50 by means of spring 118. The manner of positioning parts 28 and 30 on outer mold section carrier block 36 is carried out similar to that just described for parts 32 and 34 on block 26 and need not be further detailed, nose portion 68 on knockout pin bushing 64 serving the same longitudinal centering function as that on needle associated bushing 62.

Cooling passages, e.g., 120 and 122, are provided in the parts comprising each inner and outer composite mold section 18 and 16 beneath the article forming cavity portions thereof for circulation of a heat transfer medium in order to set the plastic relatively quickly after it is expanded outwardly against the walls of the mold. In the embodiment of the present invention, such passages have supply and discharge ends, e.g., 124 and 126 in mold section part 32, which, when a mold section part is properly positioned on its support block, are aligned with branched ends of manifolds 128 and 130 in the carrier block. Thus, cooling water passes from a suitable source of supply (not shown) through the manifolds in each carrier block and along passages 120 and 122 in the mold section parts and finally discharges again through a carrier block, e.g., through branch 130 after passing through the parts of each mold section. Cooling medium piping and perhaps flexible hose will most likely be required between the cooling medium source and each carrier block, and by means of the structure of the illustrated embodiment, such piping and hose need not be disturbed when mold section components are being replaced, since they are associated with the permanently mounted carrier blocks and not with the cores in the mold sections, such cores being designed to automatically line up with the manifold in the carrier block when the mold section parts are in proper position on the latter.

As can be appreciated, for a high volume output installation, it is important that the plastic forming the article set relatively rapidly through contact with the cooled walls of the various mold cavity portions. Consequently, it is usually desirable to have the mold sections formed of a material having a high heat conductivity, e.g., aluminum or a berylium copper alloy. On the other hand, it is desirable that the carrier blocks be formed of a more durable and less costly material, e.g., carbon steel or cast iron, since they are intended to remain in continuous use with a large variety of individual mold section components. Also, as can be appreciated, in view of the relative position of the mold section parts and carrier blocks with respect to the hot plastic within each mold cavity, the temperature of the mold section parts may tend to exceed that of the carrier blocks through which the cooling medium initially enters over a period of operating time of the machine. Consequently, if the metal of the mold section parts is different from that of the carrier block, it likewise will have a different coefficient of expansion, and depending on the magnitude of the difference, the parts of a mold section may expand more than that of the associated carrier block, and consequently provisions should be made to accommodate this differential in expansion. In the present invention, the sockets, e.g., 38 and 40, in the carrier block and mold sections are made a few thousandths of an inch oversize, in order to allow parts of the mold section to expand about the hold down bolts, which accordingly should not be drawn up too tightly in such sockets. With respect to the part of the more elongated mold section part 32, 28 at the left end of the assembly in FIG. 1, this differential is accommodated by making slots 76, 78 longer than the associated keys 74, 75 seated therein.

The above description and particularly the drawings are set forth for purposes of illustration only and are not to be taken in a limited sense.

Various modifications and alterations will be readily suggested to persons skilled in the art. It is intended, therefore, that the foregoing be considered as exemplary only and that the scope of the invention be ascertained from the following claims.

What is claimed is:

1. In a blow molding apparatus which includes separable mold sections having cavity portions which define the shape of an elongated article having a finished end portion, carrier blocks for supporting said sections, a blow needle assembly for expanding a thermoplastic parison into the shape of said article and a knockout assembly for removing said article from one of said sections, the improvement wherein each section comprises two abutting parts, each part being separately attached to the block for supporting the section of which it is a part, one of said parts being shorter than the other and having a cavity section which at least in part defines the finished portion of the article, said shorter mold part of each mold section having a bore formed therein substantially perpendicular to the plane of separation of the mold sections, said bore of each shorter mold part extending into the carrier block to which said each shorter mold part is attached, said knockout assembly being situated in the bore and bore extension of one of the shorter mold parts and said blow needle assembly being situated in the bore and bore extension of the other shorter mold part, the longer of said parts of each mold section being formed with an elongated cavity defining the body portion of the article which is in alignment with the cavity section of said shorter part and means on said blocks and parts for locating said parts in preselected position on the carrier blocks, said last mentioned means including a bushing in the extension of each bore with projecting means thereon for cooperating with an opposite surface portion of the shorter mold part and matching keys and slots in adjoining surfaces of said longer mold section parts and carrier blocks, whereby a longer mold part of a section can be replaced on its carrier block without disturbing a shorter mold part.

2. The apparatus of claim 1 including a second mold section part for each separable mold section, said second mold section part having a different body-defining cavity than said other mold section part and being adapted to be aligned exactly with the cavity of said one mold section part defining the finished portion of the article when said other mold section part is replaced with the second mold section part.

3. The apparatus of claim 1 wherein said blocks and said mold section parts attached thereon are formed of metal, the metal of said blocks being dissimilar from that of the mold section parts, and said locating means includes means for allowing the mold section parts and carrier blocks to differentially expand relative to each other.

4. The apparatus of claim 1 wherein the mold section parts have cooling channels formed therein, the ends of which register with supply and discharge manifolds formed in the carrier blocks.

5. The apparatus of claim 1 wherein the projecting means is a nose portion adapted to seat within an opposite depression in the mold part surface.

6. The apparatus of claim 1 wherein one of the abutting parts of each mold section has a pair of steps formed therein at one end and including means extending through each step for securing said step bearing part to the other abutting part of the mold section.

7. The apparatus of claim 1 wherein said mold section parts and carrier blocks are formed of metal, the metal of said parts being dissimilar from that of said blocks and the slot is longer than the key fitted therein to allow for a different rate of thermal expansion of the mold section parts with respect to the block.

8. The apparatus of claim 7 wherein the key is formed as an integral part of the carrier block and the keyway is formed in the abutting surface of the mold section part containing the cavity defining the body portion of the article, said keyway being greater in length than the key.

* * * * *